US012806913B2

(12) United States Patent
Shin

(10) Patent No.: US 12,806,913 B2
(45) Date of Patent: Nov. 24, 2026

(54) INK STORAGE DEVICE FOR MULTI-HEAD INKJET PRINTER AND MULTI-HEAD INK-JET PRINTER INCLUDING SAME

(71) Applicant: GOSANTECH CO., LTD., Cheonan-si (KR)

(72) Inventor: Dongkyun Shin, Sejong-si (KR)

(73) Assignee: GOSANTECH CO., LTD., Cheonan-si (KR)

( * ) Notice: Subject to any disclaimer, the term of this patent is extended or adjusted under 35 U.S.C. 154(b) by 108 days.

(21) Appl. No.: 19/039,231

(22) Filed: Jan. 28, 2025

(65) Prior Publication Data

US 2025/0326233 A1 Oct. 23, 2025

(30) Foreign Application Priority Data

Apr. 17, 2024 (KR) ........................ 10-2024-0051578

(51) Int. Cl.

*B41J 2/175* (2006.01)
*B41J 2/18* (2006.01)
*B41J 3/54* (2006.01)

(52) U.S. Cl.

CPC ........... *B41J 2/17596* (2013.01); *B41J 2/175* (2013.01); *B41J 2/18* (2013.01); *B41J 3/543* (2013.01); *B41J 2202/12* (2013.01)

(58) Field of Classification Search

CPC . B41J 2/17596; B41J 2/175; B41J 2/18; B41J 3/543; B41J 2202/12

See application file for complete search history.

(56) References Cited

U.S. PATENT DOCUMENTS

2021/0260889 A1* 8/2021 Tokuyama ................. B41J 2/19

FOREIGN PATENT DOCUMENTS

| | | | | | |
|---|---|---|---|---|---|
| EP | 3339039 | A1 * | 6/2018 | ................ | B41J 2/19 |
| JP | 2017007108 | A * | 1/2017 | ................ | B41J 2/18 |
| KR | 20220145493 | A * | 10/2022 | ................ | B41J 2/19 |
| KR | 10-2023-0130243 | A | 9/2023 | | |

* cited by examiner

*Primary Examiner* — Yaovi M Ameh

(74) *Attorney, Agent, or Firm* — Sughrue Mion, PLLC

(57) ABSTRACT

Proposed is an ink storage device for multi-head inkjet printers including a first section which is an airtight space where ink supplied to two or more inkjet heads is stored, and where a plurality of supply holes is formed to which a plurality of supply pipes for supplying ink to each of the two or more inkjet heads is connected, a second section isolated from the first section, which is an airtight space where ink recovered from the two or more inkjet heads is stored, and where a plurality of recovery holes is formed to which a plurality of recovery pipes for recovering ink from each of the two or more inkjet heads is connected, and a gas connection adjustment part including a gas passage through which upper air may move between the first and second sections, and a gas valve to open and close the gas passage.

14 Claims, 6 Drawing Sheets

INK STORAGE DEVICE FOR MULTI-HEAD INKJET PRINTER AND MULTI-HEAD INK-JET PRINTER INCLUDING SAME

CROSS REFERENCE TO RELATED APPLICATION

The present application claims priority to Korean Patent Application No. 10-2024-0051578, filed Apr. 17, 2024, the entire contents of which is incorporated herein for all purposes by this reference.

BACKGROUND

Technical Field

The present disclosure relates to an ink storage device for multi-head inkjet printers and a multi-head inkjet printer including the device and, more particularly, to a device that stores ink to supply ink to multiple inkjet heads in multi-head inkjet printers equipped with multi heads, and a multi-head inkjet printer including the device.

Description of the Related Art

In general, inkjet printing is a technology in which liquid ink in the form of droplets is jetted to the surface of a medium according to shape signals, and refers to a technique that creates patterns directly by spraying minuscule liquid droplets onto a printing object at a frequency of hundreds of times per second using electric or magnetic force or pneumatic pressure.

Inkjet printing began as a printing method for creating documents or flyers in the publishing printing field, but the use thereof in the industrial field is gradually increasing because the technology can form droplet patterns with high precision. Inkjet printing technology finds extensive applications in diverse fields, especially in the semiconductor or display fields, where the technology is used in solution processes to produce complex patterns on substrates or precisely discharge ink only at specific locations, and efforts are being made to apply inkjet printing as a method of generating small, precise patterns in various electronic devices.

Printing methods using inkjet printing technology include multi-pass printing, which prints the same printing area multiple times, and one-pass printing, which builds up the final image in one pass.

The one-pass printing method has a shorter printing time than the multi-pass printing method, and thus is mainly used in flat display coating processes such as thin film encapsulation (TFE) and optically clear resin (OCR), where shortening the tack time is important, and the scope of application of the one-pass printing method is gradually expanding.

Inkjet printing is performed by means of an inkjet head consisting of multiple nozzles, but the size of the inkjet head is limited when manufactured. This leads to the problem that a single inkjet head with a limited size cannot secure a printing area sufficient for applying the one-pass printing method.

To solve this problem, an inkjet printer using a multi-head with multiple inkjet heads arranged was developed (Korean Patent Application Publication No. 10-2023-0130243) as a method of printing a large area at once using the one-pass printing method.

In the case of multi-head inkjet printing, there are limitations in arranging multiple inkjet heads. Specifically, when arranging multiple inkjet heads in a row, a space is formed between the inkjet heads by a housing of a body in which the inkjet heads are installed. To overcome this problem, the inkjet heads are arranged in a zigzag manner.

Meanwhile, in order to eject a precise quantity of ink during the inkjet printing process, the ink ready to be ejected from an inkjet head needs to maintain a meniscus, the concave curved surface of the ink formed at a nozzle inlet due to capillary action. To achieve this, it is common to position an ink storage unit higher than an inkjet head and instead generate negative pressure inside an ink storage tank to prevent ink from flowing out of the inkjet head and maintain the meniscus.

Such basic configuration of an inkjet printer also applies to a multi-head inkjet printer. Each inkjet head is provided with a dedicated ink storage device, and a dedicated pressure control device is installed in each ink storage device, so that each inkjet head maintains meniscus pressure. However, having the same number of ink storage devices and pressure control devices as the number of inkjet heads not only makes manufacturing, operation, and management difficult, but also increases costs.

Moreover, as the application fields of inkjet printing have diversified recently, the use of ink with dispersed particles, such as ink with dispersed metallic particles for electrode patterns, is increasing. In particular, in the field of OLED displays, attempts are being made to apply particles of quantum dots, etc., contained in ink to a specific pattern or location only by inkjet printing using ink in which quantum dots, etc., are dispersed. Nevertheless, the applications of metallic particles and quantum dots are not actively taking place because of low dispersibility as metallic particles or quantum dots sink due to their own weight when stored in an ink storage unit.

Although to remedy this problem, a technology has been developed to maintain dispersion by returning ink from an inkjet head back to an ink storage device and circulating the ink instead of supplying the ink in one direction toward the inkjet head, if the inkjet head and the ink storage device are connected to each other by two components, an injection tube and a recovery tube, other problems may occur during the initial ink injection process. To be specific, in the initial injection process of injecting ink from the ink storage device into the empty inkjet head, ink moves simultaneously to the empty injection tube and recovery tube, and at this time, as ink moves due to the positive pressure from a pressure control device connected to the ink storage device, air may be introduced into one tube. This problem may be prevented by installing a separate pump when the ink storage device is connected to a single inkjet head, but the same solution cannot be applied in the case of multiple inkjet heads due to the gap between the inkjet heads, etc.

DOCUMENT OF RELATED ART (Patent Document 1) Korean Patent Application Publication No. 10-2023-0130243

SUMMARY

Accordingly, the present disclosure has been made keeping in mind the above problems occurring in the related art, and the present disclosure is intended to provide an ink storage device for multi-head inkjet printers, which simplifies the configuration and prevents problems that occur during the initial injection of ink by applying a single ink storage device to multiple inkjet heads.

In order to achieve the above objective, according to an aspect of the present disclosure, there is provided an ink storage device for multi-head inkjet printers, the device including: a first section which is an airtight space where ink supplied to two or more inkjet heads is stored, and where a plurality of supply holes is formed to which a plurality of supply pipes for supplying ink to each of the two or more inkjet heads is connected; a second section isolated from the first section, which is an airtight space where ink recovered from the two or more inkjet heads is stored, and where a plurality of recovery holes is formed to which a plurality of recovery pipes for recovering ink from each of the two or more inkjet heads is connected; and a gas connection adjustment part including: a gas passage through which upper air may move between the first and second sections; and a gas valve to open and close the gas passage, wherein a gas pressure control hole to which a gas pressure control pipe connected to a gas pressure control device for controlling an internal gas pressure is connected may be formed only in one of the first and second sections.

It is preferred that the ink storage device includes a drain part including: a drain hole formed in a section where the gas pressure control hole is not formed; and a drain valve configured to block a discharge of air or ink through the drain hole. The gas pressure control hole may be provided in the first section.

An injection hole to which an injection pipe for injecting ink into a storage space is connected may be formed in a section where the gas pressure control hole is formed.

The ink storage device may include an ink connection adjustment part including: an ink passage through which ink may move between the first and second sections; and an ink valve to open and close the ink passage.

The ink storage device may include a partition wall located between the first and second sections, and by which shapes of the first and second sections are determined, wherein a flat cross section of the partition wall may have a zigzag shape.

In order to achieve the above objective, according to another aspect of the present disclosure, there is provided a multi-head inkjet printer including: a multi-head part provided with multiple inkjet heads equipped with nozzles for discharging ink; an ink storage part comprising one or more ink storage devices configured to store ink to be supplied to the inkjet heads and store ink recovered from the inkjet heads; and a gas pressure control part comprising one or more gas pressure control devices respectively connected to the ink storage devices and configured to control a gas pressure inside the ink storage devices, wherein at least one of the ink storage devices includes: a first section which is an airtight space where ink supplied to two or more inkjet heads is stored, and where a plurality of supply holes is formed to which a plurality of supply pipes for supplying ink to each of the two or more inkjet heads is connected; a second section isolated from the first section, which is an airtight space where ink recovered from the two or more inkjet heads is stored, and where a plurality of recovery holes is formed to which a plurality of recovery pipes for recovering ink from each of the two or more inkjet heads is connected; and a gas connection adjustment part comprising: a gas passage through which upper air may move between the first and second sections; and a gas valve to open and close the gas passage, wherein a gas pressure control hole to which a gas pressure control pipe connected to the one or more gas pressure control devices for controlling the internal gas pressure is connected may be formed only in one of the first and second sections.

It is preferred that the ink storage device includes a drain part including: a drain hole formed in a section where the gas pressure control hole is not formed; and a drain valve configured to block a discharge of air or ink through the drain hole. The gas pressure control hole may be provided in the first section.

An injection hole to which an injection pipe for injecting ink into a storage space is connected may be formed in a section where the gas pressure control hole is formed.

The ink storage device may include an ink connection adjustment part including: an ink passage through which ink may move between the first and second sections; and an ink valve to open and close the ink passage.

The ink storage device may include a partition wall located between the first and second sections, and by which shapes of the first and second sections are determined, wherein a flat cross section of the partition wall may have a zigzag shape.

The multi-head part may have the multiple inkjet heads arranged in a zigzag manner, the one or more ink storage devices may be located above the inkjet heads to which ink is supplied, and each of the plurality of supply holes and the plurality of recovery holes may be formed to be located vertically above each inkjet head to which ink is supplied.

All of the plurality of supply pipes and recovery pipes connected between the one or more ink storage devices and the inkjet heads to which ink is supplied have the same length.

According to the present disclosure configured as described above, by completely separating an ink storage space and configuring the space to allow gas to move optionally, during the initial injection process of ink, the movement of ink can be forced in one direction, preventing air bubbles from being injected into an inkjet head during the initial injection.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
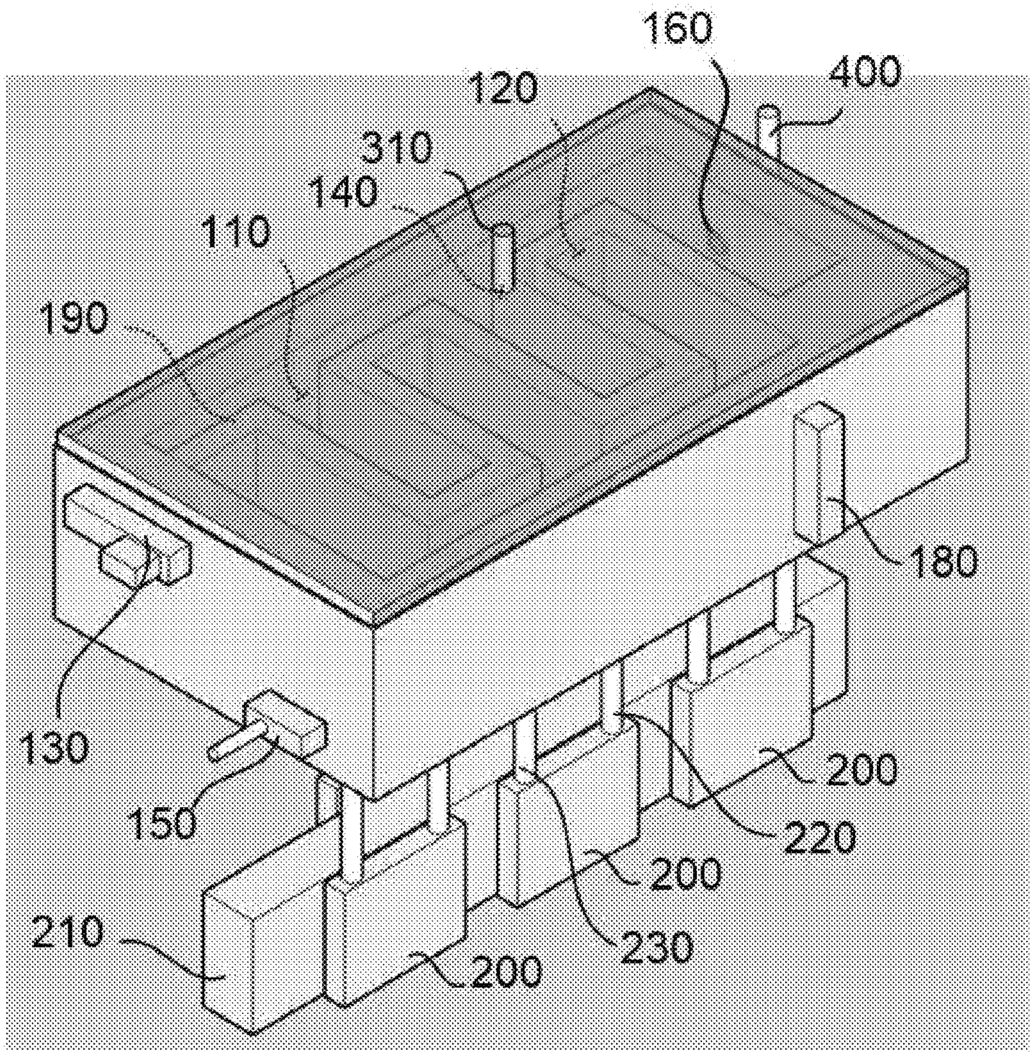
FIG. 1 is a perspective view showing the appearance of an ink storage device for multi-head inkjet printers according to a first embodiment of the present disclosure.

Embodiments of the present disclosure will be described in detail with reference to the attached drawings.

However, the embodiments of the present disclosure may be modified in various ways and the scope of the present disclosure is not limited only to the embodiments to be described below. The shape, sizes, etc. of elements may be exaggerated in the drawings for clearer description and elements indicated by the same reference numerals in the drawings are the same components.

Furthermore, when an element is referred to as being “connected with” another element throughout the specification, it may be “directly connected” to the other element and may also be “indirectly connected” to the other element with another element intervening therebetween. In addition, unless explicitly described otherwise, “comprising” or “having” any components will be understood to imply the inclusion of other components rather than the exclusion of any other components.

Terms “first”, “second”, etc. are provided for discriminating one component from another component and the scope of a right is not limited to the terms. For example, the first component may be named the second component, and vice versa.

Figure 2:
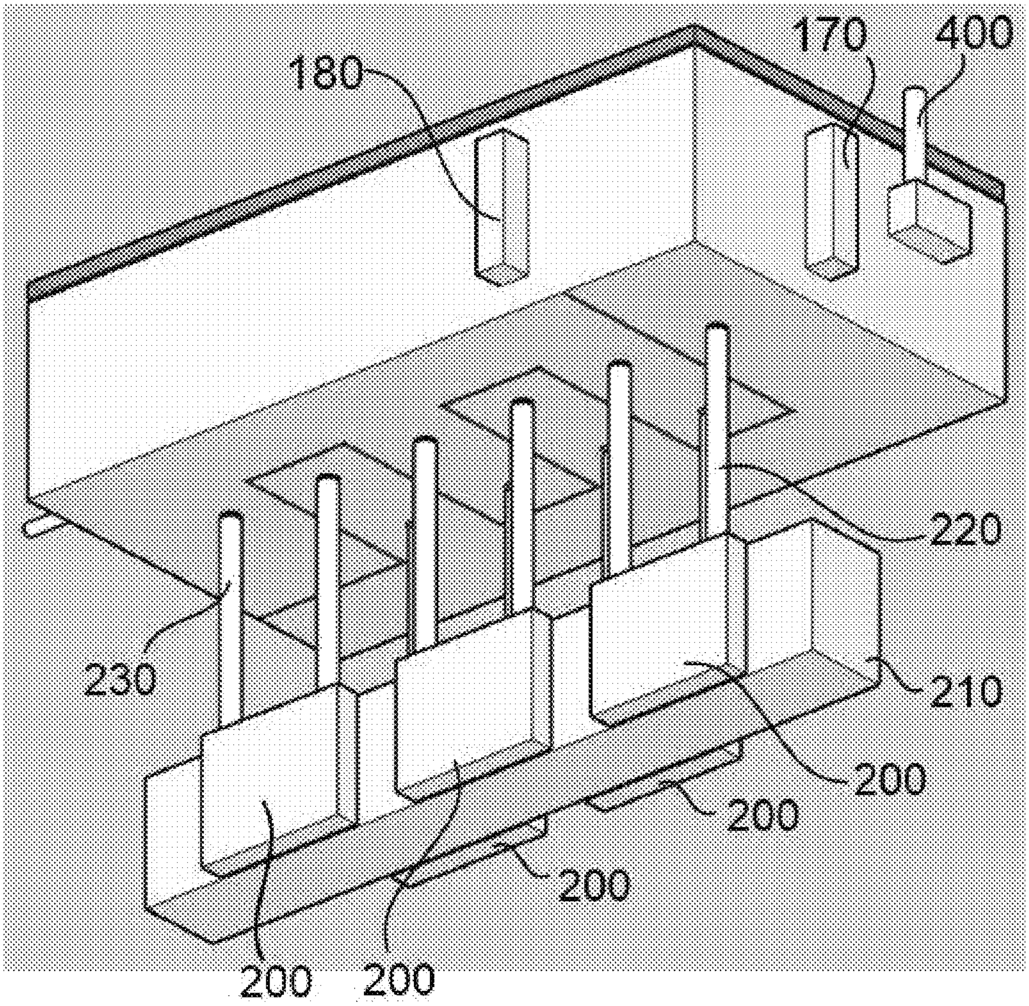
FIG. 2 is a bottom perspective view showing the appearance of the ink storage device for multi-head inkjet printers according to the first embodiment of the present disclosure.
Figure 3:
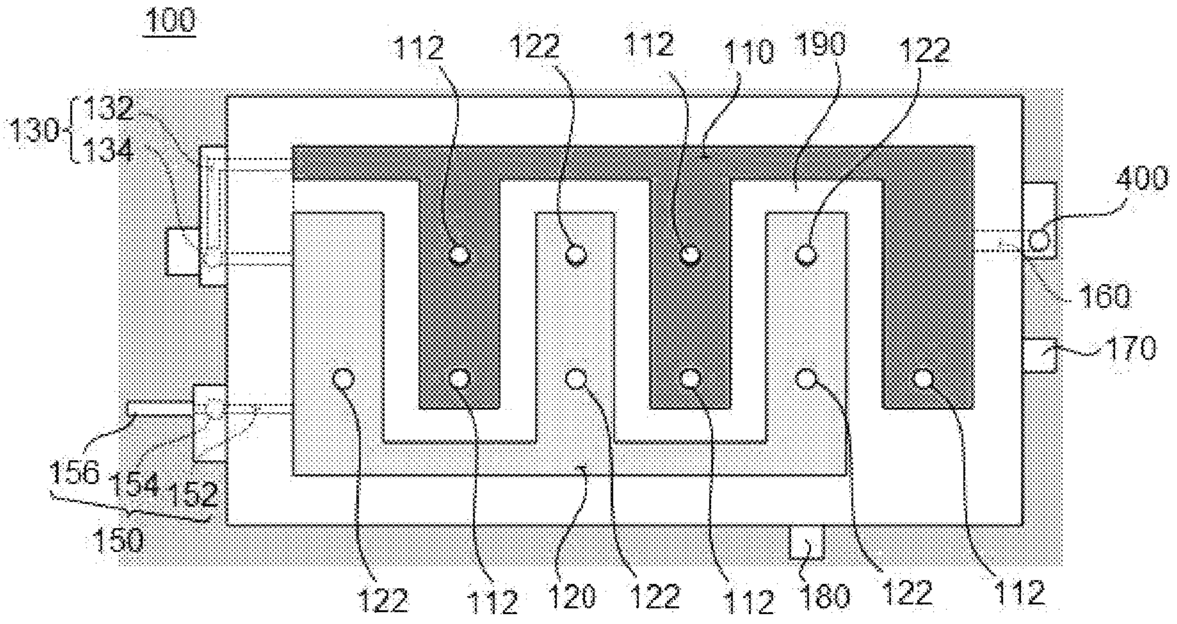
FIG. 3 is a view showing the internal appearance of the ink storage device for multi-head inkjet printers according to the first embodiment of the present disclosure.

FIG. 1 is a perspective view showing the appearance of an ink storage device for multi-head inkjet printers according to a first embodiment of the present disclosure, FIG. 2 is a bottom perspective view showing the appearance of the ink storage device for multi-head inkjet printers according to the first embodiment of the present disclosure, and FIG. 3 is a view showing the internal appearance of the ink storage device for multi-head inkjet printers according to the first embodiment of the present disclosure.

An ink storage device for multi-head inkjet printers of the present disclosure is applied to a multi-head inkjet printer including multiple inkjet heads 200. As shown, the multiple inkjet heads 200 are typically arranged in a zigzag manner on an inkjet head fixing bracket 210. In addition, the ink storage device for multi-head inkjet printers of the present disclosure is positioned above the multiple inkjet heads 200 and the inkjet head fixing bracket 210 that secures the inkjet heads 200.

The ink storage device for multi-head inkjet printers according to the first embodiment includes a first section 110, a second section 120, a gas connection adjustment part 130, a gas pressure control hole 140, a drain part 150, and an ink connection adjustment part (not shown).

Unlike conventional ink storage devices that consist of a single space for storing ink, the ink storage device for multi-head inkjet printers of the present disclosure has a space where ink is stored divided into two sections.

The first section 110 is provided with a plurality of supply holes 112 to which a plurality of supply pipes 220 are connected for supplying ink to each of two or more inkjet heads 200, and is a section for storing ink to be supplied to the inkjet heads 200.

The second section 120 is provided with a plurality of supply holes 122 to which a plurality of recovery pipes 230 are connected for recovering ink from each of two or more inkjet heads 200, and is a section for storing ink recovered from the inkjet heads 200.

The two sections are separated such that gas and ink may only move through separate connection pipes.

Conventionally, structures were applied in which an ink storage area was separated into two or more parts, but all of these were constructed in a form in which the top was open so that ink could move through the top. Accordingly, the gas pressure of each area had the same value without a separate connection means, and the entire gas pressure of the internal storage space had to be controlled simultaneously.

In contrast, the present disclosure is configured such that gas and ink may move only through a separate connection pipe, and thus has the feature of being able to completely isolate two sections by opening and closing the connection pipe.

As described above, the gas connection adjustment part 130 includes: a gas passage 132 through which gas can move between two separated sections; and a gas valve 134 to open and close the gas passage 132.

When the gas valve 134 is open, because gas can move between the first section 110 and the second section 120, the internal pressures of the first section 110 and the second section 120 are adjusted to be the same. On the other hand, when the gas valve 134 is closed, because the gas movement between the first section 110 and the second section 120 is blocked, internal pressures of the first section 110 and the second section 120 may be different from each other.

Accordingly, when the gas valve 134 is open and the internal gas pressure of one of the first section 110 and the second section 120 is adjusted, the internal gas pressures of both sections are adjusted together, but when the gas valve 134 is closed and the internal gas pressure of one of the first section 110 and the second section 120 is adjusted, only one of the first section 110 and the second section 120 is controlled. The configuration for controlling the internal gas pressure is a gas pressure control device (not shown) installed outside the ink storage device.

The installation position of the gas connection adjustment part 130, that is, the gas passage 132, is not particularly limited, but it is desirable to adjust the installation height so that ink stored in the first section 110 or the second section 120 does not move through the gas passage 132.

The gas pressure control hole 140 is a part where a gas pressure control pipe 310 connected to the gas pressure control device for controlling internal gas pressure is installed.

In the first embodiment, since the gas pressure control hole 140 to which the gas pressure control pipe 310 is connected is formed in the first section 110, the only place where the gas pressure control device may directly be connected and may control is the first section 110. However, when gas moves between the first section 110 and the second section 120, the gas pressure control device may control the gas pressure for the space where the first section 110 and the second section 120 are integrated.

In short, in the case where the gas pressure control device controls the gas pressure inside the ink storage space, when the gas valve is closed, only the pressure of the first section 110 is controlled, and when the gas valve is open, the internal pressures of the first section 110 and the second section 120 are controlled together.

Such structure, which will be described in detail later, may prevent air bubbles from being injected during the ink injection process into the inkjet heads 200 by forcing the direction of ink flow in one direction during the initial injection or forced injection process into the inkjet heads 200.

The ink connection adjustment part includes: an ink passage (not shown) through which ink can move between two separated sections as described above; and an ink valve (not shown) to open and close the ink passage.

As previously described, in the present disclosure, ink stored in the first section 110 is supplied to the inkjet heads 200, and at least a portion of the ink supplied to the inkjet heads 200 is recovered and stored in the second section 120. Thus, since ink is continuously accumulated in the second section 120 while inkjet printing is in progress, in this embodiment, the ink passage is applied to return the ink accumulated in the second section 120 to the first section 110. At this time, by providing the ink valve that may open and close the ink passage, the ink passage may be selectively connected or not connected. Although ink may move naturally due to the difference in the height of the ink stored in the second section 120 and the first section 110, the ink connection adjustment part may further include a pump to force ink to move.

The structure of the gas connection adjustment part described above may be applied similarly to the ink connection adjustment part. However, the installation position of the ink connection adjustment part, that is, the ink passage, is not particularly limited, but it is desirable to adjust the installation height so that the gas stored in the first section 110 or the second section 120 does not move through the ink passage. For example, the ink passage may be provided at a lower position than the gas passage 132.

Meanwhile, the configuration for treating ink accumulating in the second section 120 is not limited to the ink connection adjustment part applied in this embodiment, and the problem of accumulated ink may be solved by other solutions.

The drain part 150 is provided in the second section 120, and includes: a drain hole 152 for discharging the gas inside the second section 120 to the outside; and a drain valve 154 capable of blocking the discharge of gas through the drain hole 152. In this embodiment, a structure in which a drain pipe 156 connected to the drain hole 152 extends outward is applied.

The drain part 150 is configured to allow air inside the second section 120 to be discharged to the outside so that ink can move through the inkjet heads 200 to the second section 120 on the other side when positive pressure is applied to the inside of the first section 110 with the gas valve 134 closed to push out the ink.

When the air inside the second section 120 is not discharged to the outside through the drain hole 152 in this way, even if positive pressure is applied inside the first section 110 to push out the ink, the ink cannot move due to the internal pressure of the sealed second section 120.

Furthermore, in this embodiment, by installing the drain hole 152 at a low position above the floor level, in the initial injection process of injecting the ink stored in the first section 110 into the inkjet head 200 while the second section 120 is empty, the ink that has moved to the second section 120 may be detected being discharged through the drain hole 152.

In addition, the ink storage device for multi-head inkjet printers according to this embodiment includes an injection hole 160, a first water level sensor 170, and a second water level sensor 180.

The injection hole 160 is where the ink injection pipe 400 for injecting external ink into the ink storage space inside the ink storage device is connected.

In this embodiment, the injection hole 160 is formed in the first section 110. As previously described, in this embodiment, by forming the gas pressure control hole 140 in the first section 110 and connecting the hole 140 to the gas pressure control device, the ink stored in the first section 110 is supplied to the inkjet heads 200 during the initial injection process. Thus, the ink injection hole 160 is formed in the first section 110 so that ink may be initially injected into the first section 110.

The first water level sensor 170 is a component that detects the height of ink stored in the first section 110, and the second water level sensor 180 is a component that measures the height of ink stored in the second section 120.

During the operation of an inkjet printer, it is necessary to detect the amount of ink stored in the ink storage device.

In the present disclosure, since ink is stored in each of the separated first section 110 and second section 120, a water level sensor is installed in each of the first section 110 and second section 120.

The first water level sensor 170 and the second water level sensor 180 are also used in the process of managing ink stored in each section to prevent the ink from flowing into the gas passage 132.

The ink storage device for multi-head inkjet printers according to this embodiment may further include a stirring part for stirring ink stored in the storage space.

As previously described, the ink storage device of this embodiment not only supplies ink to the inkjet heads 200, but also recovers at least a portion of the ink supplied to the inkjet heads 200 to allow the ink to flow rather than stagnate. This is a response to the increasing use of ink with various particles dispersed as the application fields of inkjet printing become more diverse, and is to continuously flow ink to solve dispersibility problems including particles sinking due to the weight of the particles themselves. However, as the size of particles applied to ink becomes increasingly larger, and the use of particles several micrometers in size is required, and it may be difficult to maintain dispersibility through the circulating flow of ink alone.

In this context, the stirring part may be additionally applied to maintain the dispersibility of ink, and in this case, a stirring method tailored to the characteristics of the ink storage device in which the first section 110 and the second section 120 are separated needs to be applied.

Below, the operation of the ink storage device for multi-head inkjet printers according to the first embodiment of the present disclosure in a variety of processes using an inkjet printer will be described.

To be specific, the ink storage device for multi-head inkjet printers according to the first embodiment of the present disclosure behaves differently during the initial injection or forced injection process and during the inkjet printing process.

Figure 4:
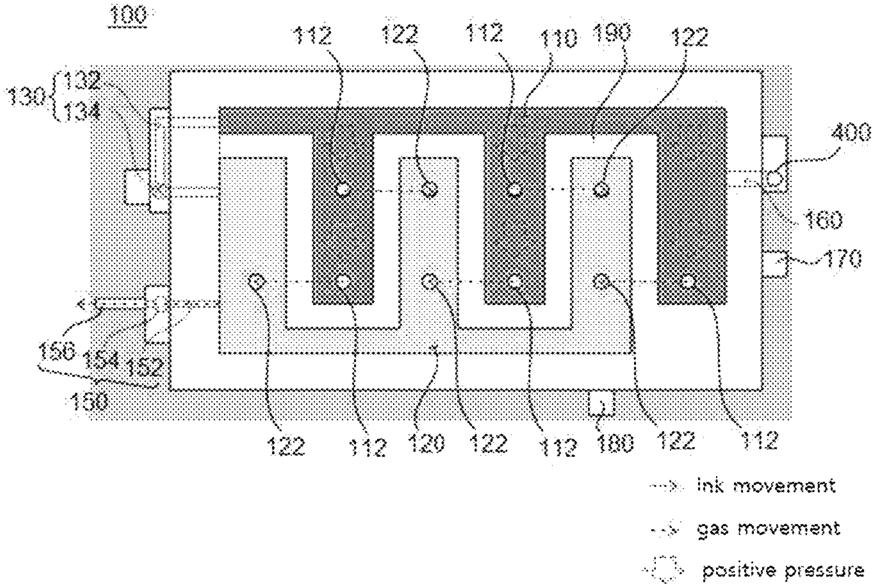
FIG. 4 is a cross-sectional view showing how the ink storage device for multi-head inkjet printers according to the first embodiment of the present disclosure operates during the initial injection process.

FIG. 4 is a cross-sectional view showing how the ink storage device for multi-head inkjet printers according to the first embodiment of the present disclosure operates during the initial injection process.

First, the initial injection process is explained as follows.

The initial injection is a process of supplying ink to the inkjet heads 200 while the inkjet heads 200 are empty. This is an operation that is frequently performed during first use of an inkjet printer or during reuse after maintenance.

First, with the ink valve closed, ink is injected into the first section 110 through the injection hole 160.

At this time, some ink may move to the empty supply pipe 220 due to the influence of gravity, but not a large amount moves. To prevent this, movement of ink to the supply pipe 220 may be blocked.

Next, with ink injected only into the first section, the gas valve 134 is closed and positive pressure is applied to the first section 110 using the gas pressure control device.

Since the gas inside the first section 110 cannot move to the second section 120 due to the closed gas valve 134, all of the positive pressure applied to the first section 110 acts on the ink stored in the first section 110, and the ink to which the positive pressure is applied moves to the inkjet heads 200 along the supply pipe 220.

The ink that completely fills the inkjet heads 200 moves along the recovery pipes 230 and moves to the second section 120.

At this time, as previously described, the drain hole 152 formed in the second section 120 is opened to allow the gas filled in the second section 120 to be discharged to the outside. Due to this, the process in which the ink stored in the first section 110 is supplied to the inkjet heads 200 through the supply pipe 220 and then moves to the second section 120 through the recovery pipes 230 may proceed without problems.

In addition, in this embodiment, since the drain hole 152 is formed low to the floor level, ink may be discharged along the drain hole 152 immediately after the ink moves to the second section 120. When ink is discharged through the drain hole 152, it implies that the ink in the first section has filled all of the inkjet heads 200 and the recovery pipe 230, and accordingly, the drain hole 152 is closed and the positive pressure applied to the first section 110 is removed.

When supplying ink to the empty inkjet heads 200 through the above process, by forcing the ink to move in one direction through the supply pipe 220 to sequentially move through the inkjet head 200 and the recovery pipe 230, the problem of air being injected together through the supply pipe 220 or the recovery pipe 230 may be prevented.

Next, the forced injection is a process of forcibly circulating ink while ink is present in an inkjet head, etc., and this may be applied in the process of removing bubbles when bubbles are generated in the inkjet head.

The forced injection is the same as the initial injection in that the ink is forced to move in one direction as the gas valve 134 is closed and positive pressure is applied only to the first section 110 with ink present in both the first section 110 and the second section 120.

At this time, the ink may be discharged through the drain hole 152 or adjusted to move through the ink passage so that the ink is able to move to the sealed second section with the gas valve 134 closed, which is different from the initial injection process.

Figure 5:
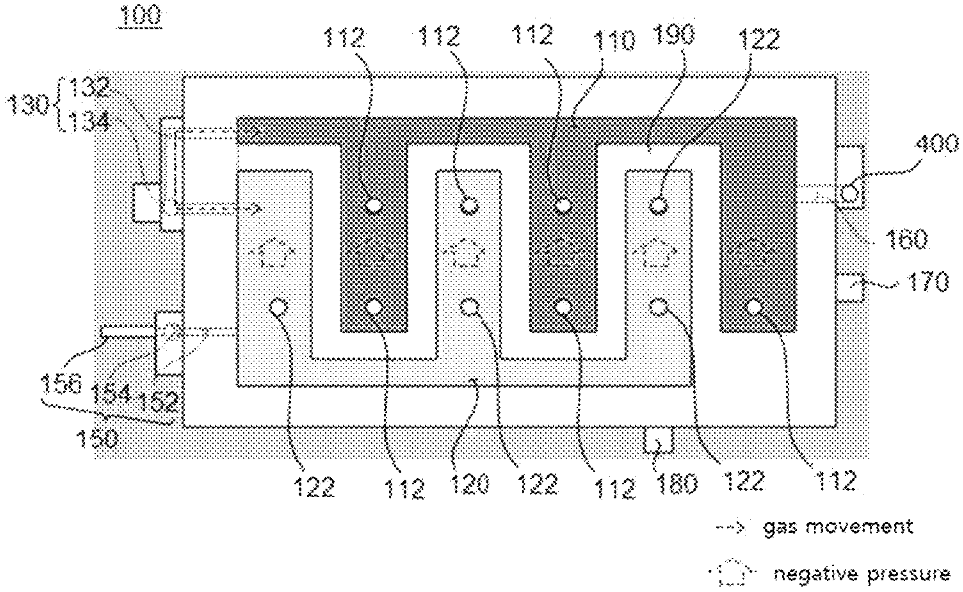
FIG. 5 is a cross-sectional view showing the ink storage device for multi-head inkjet printers according to the first embodiment of the present disclosure operating in an inkjet printing process.

FIG. 5 is a cross-sectional view showing the ink storage device for multi-head inkjet printers according to the first embodiment of the present disclosure operating in an inkjet printing process.

Lastly, the inkjet printing process state is a process of printing by spraying ink through the inkjet heads 200 after the initial injection or forced injection process is completed.

At this time, the gas pressure control device applies negative pressure for precise ink ejection. However, when the gas pressure control device applies negative pressure while the gas valve 134 is closed, the negative pressure is applied only to the first section 110, and thus precise inkjet printing cannot be performed. Therefore, the gas valve 134 is opened to allow gas to move between the first section 110 and the second section 120, so that the internal gas pressures in the first section 110 and the second section 120 are the same. In this way, with the internal gas pressures in the first section 110 and the second section 120 set to the same level, negative pressure is applied and the inkjet printing is performed.

At this time, since ink is recovered and stored in the second section 120, the drain valve 154 needs to be kept closed.

Hereinafter, the shapes of the first section 110 and the second section 120 in the ink storage device for multi-head inkjet printers of this embodiment will be described.

As shown, in the ink storage device for multi-head inkjet printers according to the first embodiment of the present disclosure, the boundaries between the first section 110 and the second section 120 are arranged in a zigzag shape.

This corresponds to the fact that the plurality of inkjet heads 200 to which ink is supplied by the storage device according to this embodiment is arranged in a zigzag manner. Specifically, the supply holes 112 formed in the first section 110 and the supply holes 122 formed in the second section 120 are respectively located exactly at the upper parts of the inkjet heads 200 to which ink is supplied, and accordingly, the plurality of supply pipes 220 and the plurality of recovery pipes 230 connected to the plurality of inkjet heads 200 are all the same length.

In the case where ink is supplied from one ink storage device to a plurality of inkjet heads 200, if the lengths of the plurality of supply pipes 220 and the plurality of recovery pipes 230 are different, it may be a factor that hinders precise inkjet printing. Thus, for precise inkjet printing, the plurality of supply pipes 220 and recovery pipes 230 are all configured to have the same length. At this time, the shapes of the first section 110 and the second section 120 are set so that the supply hole 112 and the supply hole 122 are located at corresponding positions on the upper part of each inkjet head 200 because if the lengths of the plurality of supply pipes 220 and the plurality of recovery pipes 230 are excessively long to match the lengths, it may also be a factor that hinders precise inkjet printing.

For this purpose, a partition wall 190 located between the first section 110 and the second section 120 is provided in a zigzag shape, and as shown, a pair of supply holes 112 and 122 may be arranged above each inkjet head 200 with the partition wall 190 between the pair of supply holes 112 and 122. The shape of the partition wall 190 is not limited to the angled square shape as shown, and is not particularly limited as long as it can distinguish between the first section 110 and the second section 120 so that the corresponding supply holes 112 and 122 are located above the plurality of inkjet heads. For example, shape of the partition wall 190 may be configured in the form of an angled triangle, or in the form of a non-angular curve.

Meanwhile, the embodiment described so far explains the structure of supplying ink to all five inkjet heads 200 through one ink storage device in a multi-head inkjet printer using the five inkjet heads 200.

However, the present disclosure is not limited to the above case, and a configuration including one or more ink storage devices for supplying ink to two or more inkjet heads 200 may be used in combination with a plurality of ink storage devices.

For example, in the structure with the five inkjet heads 200 shown, two ink storage devices, one for supplying ink to two inkjet heads and the other for supplying ink to three inkjet heads, may be applied. In this case, for the configuration for supplying ink to two or more inkjet heads from one ink storage device, the same configuration may be applied as in the case of the ink storage device of the previously described embodiment, except that the number of supply holes 112 and 122 is reduced. At this time, the gas pressure control device should be installed for each ink storage device.

When two or more ink storage devices and gas pressure control devices are used, the structure may be more complicated than in the case of previous embodiment in which one ink storage device and one gas pressure control device are applied, but becomes very simple compared to the case where five ink storage devices and five gas pressure control devices are used for the five inkjet heads. In addition, by combining multiple ink storage devices for various multi-head inkjet printers with different numbers of inkjet heads, a set of appropriate ink storage devices may be flexibly configured according to the number of inkjet heads of each multi-head inkjet printer.

Figure 6:
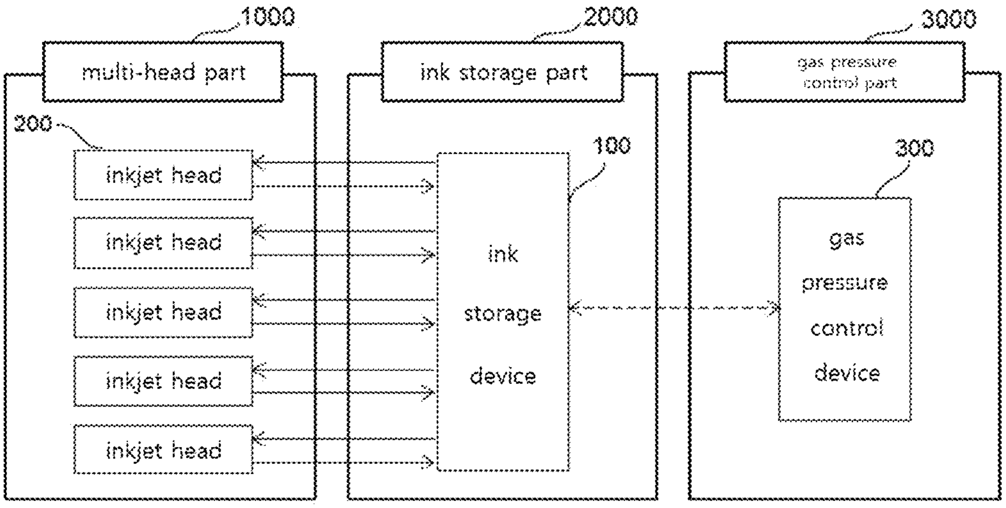
FIG. 6 is a view showing the configuration of a multi-head inkjet printer according to a second embodiment of the present disclosure.

FIG. 6 is a view showing the configuration of a multi-head inkjet printer according to a second embodiment of the present disclosure.

The multi-head inkjet printer according to the second embodiment of the present disclosure includes a multi-head part 1000, an ink storage part 2000, and a gas pressure control part 3000.

The specific configuration of the multi-head inkjet printer according to the second embodiment of the present disclosure will be described with reference to FIGS. 1 to 3.

The multi-head part 1000 is a component provided with multiple inkjet heads 200 equipped with nozzles for discharging ink.

The multiple inkjet heads 200 are provided to print a large area at once using a one-pass printing method, which builds up the final image by printing the same print area at once.

To solve the problem of space forming between inkjet heads when placing multiple inkjet heads in a row due to a housing of a body where the inkjet heads 200 are installed, the inkjet heads 200 are arranged in a zigzag manner on an inkjet head fixing bracket 210.

Since other technical details of the inkjet head 200 may be applied without limitation as long as they do not impair the characteristics of the present disclosure, detailed descriptions are omitted.

The ink storage part 2000 is a component that includes an ink storage device 100 that stores ink to be supplied to the inkjet heads 200 and ink recovered from the inkjet heads 200.

The ink storage device 100 is connected to the inkjet heads 200 through a plurality of supply pipes 220 for supplying ink to each of the inkjet heads 200 and a plurality of recovery pipes 230 for recovering ink from each of the inkjet heads 200.

The ink storage device 100 applied to the multi-head inkjet printer according to this embodiment includes a first section 110, a second section 120, a gas connection adjustment part 130, a gas pressure control hole 140, an ink connection adjustment part, and a drain part 150.

Unlike conventional ink storage devices that consist of a single for storing ink, the ink storage device applied in this embodiment has a space for storing ink divided into two sections.

The first section 110 is provided with a plurality of supply holes 112 to which a plurality of supply pipes 220 are connected for supplying ink to each of two or more inkjet heads 200, and is a section for storing ink to be supplied to the inkjet heads 200.

The second section 120 is provided with a plurality of supply holes 122 to which a plurality of recovery pipes 230 are connected for recovering ink from each of two or more inkjet heads 200, and is a section for storing ink recovered from the inkjet heads 200.

The two sections are separated such that gas and ink may only move through separate connection pipes.

Conventionally, structures were applied in which an ink storage area was separated into two or more parts, but all of these were constructed in a form in which the top was open so that ink could move through the top. Accordingly, the gas pressure of each area had the same value without a separate connection means, and the entire gas pressure of the internal storage space had to be controlled simultaneously.

In contrast, the present disclosure is configured such that gas and ink may move only through a separate connection pipe, and thus has the feature of being able to completely isolate two sections by opening and closing the connection pipe.

As described above, the gas connection adjustment part 130 includes: a gas passage 132 through which gas can move between two separated sections; and a gas valve 134 to open and close the gas passage 132.

When the gas valve 134 is open, because gas can move between the first section 110 and the second section 120, the internal pressures of the first section 110 and the second section 120 are adjusted to be the same. On the other hand, when the gas valve 134 is closed, because the gas movement between the first section 110 and the second section 120 is blocked, internal pressures of the first section 110 and the second section 120 may be different from each other.

Accordingly, when the gas valve 134 is open and the internal gas pressure of one of the first section 110 and the second section 120 is adjusted, the internal gas pressures of both sections are adjusted together, but when the gas valve 134 is closed and the internal gas pressure of one of the first section 110 and the second section 120 is adjusted, only one of the first section 110 and the second section 120 is controlled. The configuration for controlling the internal gas pressure is a gas pressure control device installed outside the ink storage device.

The installation position of the gas connection adjustment part 130, that is, the gas passage 132, is not particularly limited, but it is desirable to adjust the installation height so that ink stored in the first section 110 or the second section 120 does not move through the gas passage 132.

The gas pressure control hole 140 is a part where a gas pressure control pipe 310 connected to the gas pressure control device for controlling internal gas pressure is installed.

In the present embodiment, since the gas pressure control hole 140 to which the gas pressure control pipe 310 is connected is formed in the first section 110, the only place where the gas pressure control device may directly be connected and may control is the first section 110. However, when gas moves between the first section 110 and the second section 120, the gas pressure control device may control the gas pressure for the space where the first section 110 and the second section 120 are integrated.

In short, in the case where the gas pressure control device controls the gas pressure inside the ink storage space, when the gas valve is closed, only the pressure of the first section 110 is controlled, and when the gas valve is open, the internal pressures of the first section 110 and the second section 120 are controlled together.

Such structure, which will be described in detail later, may prevent air bubbles from being injected during the ink injection process into the inkjet heads 200 by forcing the direction of ink flow in one direction during the initial injection or forced injection process into the inkjet heads 200.

The ink connection adjustment part includes: an ink passage through which ink can move between two separated sections as described above; and an ink valve to open and close the ink passage.

As previously described, in the present embodiment, ink stored in the first section 110 is supplied to the inkjet heads 200, and at least a portion of the ink supplied to the inkjet heads 200 is recovered and stored in the second section 120. Thus, since ink is continuously accumulated in the second section 120 while inkjet printing is in progress, in this embodiment, the ink passage is applied to return the ink accumulated in the second section 120 to the first section 110. At this time, by providing the ink valve that may open and close the ink passage, the ink passage may be selectively connected or not connected. Although ink may move naturally due to the difference in the height of the ink stored in the second section 120 and the first section 110, the ink connection adjustment part may further include a pump to force ink to move.

The structure of the gas connection adjustment part described above may be applied similarly to the ink connection adjustment part. However, the installation position of the ink connection adjustment part, that is, the ink passage, is not particularly limited, but it is desirable to adjust the installation height so that the gas stored in the first section 110 or the second section 120 does not move through the ink passage. For example, the ink passage may be provided at a lower position than the gas passage 132.

Meanwhile, the configuration for treating ink accumulating in the second section 120 is not limited to the ink connection adjustment part applied in this embodiment, and the problem of accumulated ink may be solved by other solutions.

The drain part 150 is provided in the second section 120, and includes: a drain hole 152 for discharging the gas inside the second section 120 to the outside; and a drain valve 154 capable of blocking the discharge of gas through the drain hole 152. In this embodiment, a structure in which a drain pipe 156 connected to the drain hole 152 extends outward is applied.

The drain part 150 is configured to allow air inside the second section 120 to be discharged to the outside so that ink can move through the inkjet heads 200 to the second section 120 on the other side when positive pressure is applied to the inside of the first section 110 with the gas valve 134 closed to push out the ink.

When the air inside the second section 120 is not discharged to the outside through the drain hole 152 in this way, even if positive pressure is applied inside the first section 110 to push out the ink, the ink cannot move due to the internal pressure of the sealed second section 120.

Furthermore, in this embodiment, by installing the drain hole 152 at a low position above the floor level, in the initial injection process of injecting the ink stored in the first section 110 into the inkjet head 200 while the second section 120 is empty, the ink that has moved to the second section 120 may be detected being discharged through the drain hole 152.

In addition, the ink storage device applied to the multi-head inkjet printer according to this embodiment includes an injection hole 160, a first water level sensor 170, and a second water level sensor 180.

The injection hole 160 is where the ink injection pipe 400 for injecting external ink into the ink storage space inside the ink storage device is connected.

In this embodiment, the injection hole 160 is formed in the first section 110. As previously described, in this embodiment, by forming the gas pressure control hole 140 in the first section 110 and connecting the hole 140 to the gas pressure control device, the ink stored in the first section 110 is supplied to the inkjet heads 200 during the initial injection process. Thus, the ink injection hole 160 is formed in the first section 110 so that ink may be initially injected into the first section 110.

The first water level sensor 170 is a component that detects the height of ink stored in the first section 110, and the second water level sensor 180 is a component that measures the height of ink stored in the second section 120.

During the operation of an inkjet printer, it is necessary to detect the amount of ink stored in the ink storage device.

In the present disclosure, since ink is stored in each of the separated first section 110 and second section 120, a water level sensor is installed in each of the first section 110 and second section 120.

The first water level sensor 170 and the second water level sensor 180 are also used in the process of managing ink stored in each section to prevent the ink from flowing into the gas passage 132.

As shown, in the ink storage device applied to the multi-head inkjet printer according to the second embodiment of the present disclosure, the boundaries between the first section 110 and the second section 120 are arranged in a zigzag shape.

This corresponds to the fact that the plurality of inkjet heads 200 is arranged in a zigzag manner in the multi-head inkjet printer according to this embodiment. Specifically, the supply holes 112 formed in the first section 110 and the supply holes 122 formed in the second section 120 are respectively located exactly at the upper parts of the inkjet heads 200 to which ink is supplied, and accordingly, the plurality of supply pipes 220 and the plurality of recovery pipes 230 connected to the plurality of inkjet heads 200 are all the same length.

In the case where ink is supplied from one ink storage device to a plurality of inkjet heads 200, if the lengths of the plurality of supply pipes 220 and the plurality of recovery pipes 230 are different, it may be a factor that hinders precise inkjet printing. Thus, for precise inkjet printing, the plurality of supply pipes 220 and recovery pipes 230 are all configured to have the same length. At this time, the shapes of the first section 110 and the second section 120 are set so that the supply hole 112 and the supply hole 122 are located at corresponding positions on the upper part of each inkjet head 200 because if the lengths of the plurality of supply pipes 220 and the plurality of recovery pipes 230 are excessively long to match the lengths, it may also be a factor that hinders precise inkjet printing.

For this purpose, a partition wall 190 located between the first section 110 and the second section 120 is provided in a zigzag shape, and as shown, a pair of supply holes 112 and 122 may be arranged above each inkjet head 200 with the partition wall 190 in between. The shape of the partition wall 190 is not limited to the angled square shape as shown, and is not particularly limited as long as it can distinguish between the first section 110 and the second section 120 so that the corresponding supply holes 112 and 122 are located above the plurality of inkjet heads. For example, shape of the partition wall 190 may be configured in the form of an angled triangle, or in the form of a non-angular curve.

The gas pressure control part 3000 is a component that includes a gas pressure control device 300 that is connected to the ink storage device 100 and controls the gas pressure inside the ink storage device 100.

As previously described, the gas pressure control device is connected to the ink storage device 100 through the gas pressure control pipe 310 connected to the gas pressure control hole 140 formed in the first section 110. Since other technical details of the gas pressure control device may be applied without limitation as long as they do not impair the characteristics of the present disclosure, detailed descriptions are omitted.

Meanwhile, the embodiment described so far explains the structure of supplying ink to all five inkjet heads 200 through one ink storage device in a multi-head inkjet printer using the five inkjet heads 200.

However, the present disclosure is not limited to the above case, and a configuration including one or more ink storage devices for supplying ink to two or more inkjet heads 200 may be used in combination with a plurality of ink storage devices.

For example, in the structure with the five inkjet heads 200 shown, two ink storage devices, one for supplying ink to two inkjet heads and the other for supplying ink to three inkjet heads, may be applied. In this case, for the configuration for supplying ink to two or more inkjet heads from one ink storage device, the same configuration may be applied as in the case of the ink storage device of the previously described embodiment, except that the number of supply holes 112 and 122 is reduced. At this time, the gas pressure control device should be installed for each ink storage device.

When two or more ink storage devices and gas pressure control devices are used, the structure may be more complicated than in the case of previous embodiment in which one ink storage device and one gas pressure control device are applied, but becomes very simple compared to the case where five ink storage devices and five gas pressure control devices are used for the five inkjet heads. In addition, by combining multiple ink storage devices for various multi-head inkjet printers with different numbers of inkjet heads, a set of appropriate ink storage devices may be flexibly configured according to the number of inkjet heads of each multi-head inkjet printer.

Preferred embodiments of the present disclosure have been described above, but it should be understood by those skilled in the art that the embodiments described above are only examples of the spirit of the present disclosure and the present disclosure may be changed in various ways without departing from the spirit of the present disclosure. Therefore, the protective range of the present disclosure should be construed on the basis of claims rather than specific embodiments and all of spirits within the equivalent range should be construed as being included in the range of right of the present disclosure.

What is claimed is:

1. An ink storage device used in a multi-head inkjet printer equipped with a plurality of inkjet heads, the device comprising:

a first section which is an airtight space where ink supplied to two or more inkjet heads is stored, and where a plurality of supply holes is formed to which a plurality of supply pipes for supplying ink to each of the two or more inkjet heads is connected;

a second section isolated from the first section, which is an airtight space where ink recovered from the two or more inkjet heads is stored, and where a plurality of recovery holes is formed to which a plurality of recovery pipes for recovering ink from each of the two or more inkjet heads is connected; and a gas connection adjustment part comprising: a gas passage through which upper air may move between the first and second sections; and a gas valve to open and close the gas passage, wherein a gas pressure control hole to which a gas pressure control pipe connected to a gas pressure control device for controlling an internal gas pressure is connected is formed only in one of the first and second sections.

2. The device of claim 1, further comprising:

a drain part comprising: a drain hole formed in a section where the gas pressure control hole is not formed; and a drain valve configured to block a discharge of air or ink through the drain hole.

3. The device of claim 2, wherein the gas pressure control hole is provided in the first section.

4. The device of claim 1, wherein an injection hole to which an injection pipe for injecting ink into a storage space is connected is formed in a section where the gas pressure control hole is formed.

5. The device of claim 1, further comprising:

an ink connection adjustment part comprising: an ink passage through which ink may move between the first and second sections; and an ink valve to open and close the ink passage.

6. The device of claim 1, further comprising:

a partition wall located between the first and second sections, and by which shapes of the first and second sections are determined, wherein a flat cross section of the partition wall has a zigzag shape.

7. A multi-head inkjet printer, comprising:

a multi-head part provided with multiple inkjet heads equipped with nozzles for discharging ink;

an ink storage part comprising one or more ink storage devices configured to store ink to be supplied to the inkjet heads and store ink recovered from the inkjet heads; and a gas pressure control part comprising one or more gas pressure control devices respectively connected to the ink storage devices and configured to control a gas pressure inside the ink storage devices, wherein at least one of the ink storage devices comprises:

a first section which is an airtight space where ink supplied to two or more inkjet heads is stored, and where a plurality of supply holes is formed to which a plurality of supply pipes for supplying ink to each of the two or more inkjet heads is connected;

a second section isolated from the first section, which is an airtight space where ink recovered from the two or more inkjet heads is stored, and where a plurality of recovery holes is formed to which a plurality of recovery pipes for recovering ink from each of the two or more inkjet heads is connected; and a gas connection adjustment part comprising: a gas passage through which upper air may move between the first and second sections; and a gas valve to open and close the gas passage, wherein a gas pressure control hole to which a gas pressure control pipe connected to the one or more gas pressure control devices for controlling the internal gas pressure is connected is formed only in one of the first and second sections.

8. The printer of claim 7, further comprising:

a drain part comprising: a drain hole formed in a section where the gas pressure control hole is not formed; and a drain valve configured to block a discharge of air or ink through the drain hole.

9. The printer of claim 8, wherein the gas pressure control hole is provided in the first section.

10. The printer of claim 7, wherein an injection hole to which an injection pipe for injecting ink into a storage space is connected is formed in a section where the gas pressure control hole is formed.

11. The printer of claim 7, further comprising:

an ink connection adjustment part comprising: an ink passage through which ink may move between the first and second sections; and an ink valve to open and close the ink passage.

12. The printer of claim 7, further comprising:

a partition wall located between the first and second sections, and by which shapes of the first and second sections are determined, wherein a flat cross section of the partition wall has a zigzag shape.

13. The printer of claim 12, wherein the multi-head part has the multiple inkjet heads arranged in a zigzag manner, the one or more ink storage devices are located above the inkjet heads to which ink is supplied, and each of the plurality of supply holes and the plurality of recovery holes is formed to be located vertically above each inkjet head to which ink is supplied.

14. The printer of claim 12, wherein all of the plurality of supply pipes and recovery pipes connected between the one or more ink storage devices and the inkjet heads to which ink is supplied have a same length.

* * * * *